United States Patent [19]

Ohta et al.

[11] 4,384,304
[45] May 17, 1983

[54] APPARATUS FOR RECEIVING MULTIPLEX INFORMATION SIGNAL

[75] Inventors: Masutomi Ohta; Minoru Sakai, both of Yokohama, Japan

[73] Assignee: Hitachi, Ltd., Tokyo, Japan

[21] Appl. No.: 269,509

[22] Filed: Jun. 1, 1981

[30] Foreign Application Priority Data

Jun. 2, 1980 [JP] Japan ................................. 55-72770

[51] Int. Cl.³ .............................................. H04N 7/08
[52] U.S. Cl. ..................................... 358/147; 358/142
[58] Field of Search ............. 358/141, 142, 147, 21 V; 370/110.4, 111

[56] References Cited

U.S. PATENT DOCUMENTS

| | | | |
|---|---|---|---|
| 4,202,012 | 5/1980 | Hirashima | 358/147 |
| 4,266,244 | 5/1981 | Itoh | 358/147 |
| 4,281,345 | 7/1981 | Wärn | 358/147 |
| 4,303,942 | 12/1981 | Fukuda et al. | 358/147 |

*Primary Examiner*—Richard Murray
*Attorney, Agent, or Firm*—Antonelli, Terry & Wands

[57] ABSTRACT

A method of and an apparatus for securely and precisely extracting from a received television signal a start pulse signal which is a binary signal provided at the beginning of an information signal multiplexed in the vertical blanking period of the television signal is disclosed. A PLL circuit acting as a frequency multiplier is provided to obtain a multiplied-frequency signal synchronized with a horizontal synchronizing signal (separated from the television signal by a synchronizing separator circuit) and having a frequency N times equal to or higher than a horizontal synchronizing frequency, first and second extracting gate pulses are formed from the multiplied-frequency signal, the start pulse signal is extracted from the received television signal by the first extracting gate pulse, the extracted start pulse signal is made to pass through a filter resonating with the start pulse signal to remove a noise component, a waveform at a central portion of the filtered start pulse signal is extracted by the second extracting gate pulse, and the extracted waveform is produced as a start pulse for bit synchronization of the information signal.

7 Claims, 17 Drawing Figures

APPARATUS FOR RECEIVING MULTIPLEX INFORMATION SIGNAL

The present invention relates to techniques for processing a bit synchronizing signal added to a multiplex information signal, and more particularly to a method of and an apparatus for receiving a multiplex information signal in which a binary signal formed by coding information such as an earthquake alarm, a character and a facsimile signal is inserted in a television signal at the vertical blanking period thereof.

In order to give a better understanding of the present invention, explanation will first be made of the character multiplex broadcasting, on which the present invention is based and in which a binary signal of such information as a character and a picture is transmitted in the vertical blanking period of television signal or the television field-blanking interval, and of an apparatus for receiving the broadcasting. The character multiplex broadcasting is described in an article entitled "Mojitaju hoso no Kaihatsu to Genjyo (Development and Current State of character Multiplex Broadcasting) (Materials IC-2 for 1979 Meeting of Electronic Engineering, published by Electronic Industries Association of Japan on October, 1979), and in a publication entitled "CEE-FAX" March 1978, edited by British Broadcasting Corporation (printed by Keniston Press Ltd.). FIG. 1 shows a multiplex signal employed in the character multiplex broadcasing according to the NTSC system in Japan, by way of example. As can be seen from FIG. 1, the character multiplex signal is formed on the basis of a period $T_c$ (of 0.174 μsec), which is determined by dividing one horizontal period (63.5 μsec) by 364. As a result, the bit rate frequency becomes 5.73 MHz. FIG. 2 is an enlarged view for showing in detail a header portion of the multiplex signal. As shown in FIG. 2, at the head of the multiplex signal is provided a start pulse signal (hereinafter referred to as an "STX" signal) which is called "clock-run-in" and includes eight pulses. The 8-pulse insertion system is also employed in England. The STX signal which is a coded binary signal, is used to give bit synchronization to subsequent parts of the character multiplex signal. The method of using the STX signal is disclosed in, for example, a Japanese patent application filed on Aug. 21, 1974 and laid open on Feb. 24, 1976 (Application No. 94911/74 and Laid-open No. 23019/76). FIG. 3 shows a conventional circuit for extracting the STX signal, which is disclosed in the above-referenced Japanese patent application.

Referring to FIG. 3, a horizontal synchronizing signal from a synchronizing separator circuit is applied to a horizontal synchronizing signal input terminal 1. The horizontal sync signal is converted into a gate pulse shown in FIG. 4(c) by a monostable multivibrator 2 for delaying an input pulse, a monostable multivibrator 3 for forming a gate width (such as shown in FIG. 4(c)), capacitors $C_1$ and $C_2$, and resistors $R_1$ and $R_2$. Each of the elements $C_1$, $C_2$, $R_1$ and $R_2$ is adjustable and is connected to the corresponding monostable multivibrator 2 or 3 from the outside. On the other hand, a television signal shown in FIG. 4(a) is applied through a data input terminal IN to an amplitude comparator 9 (i.e. an A-D converter), to be compared with a slice level (or reference level) determined by resistors $R_3$ and $R_4$. The output of the converter 9 is applied to an inverter 4, the output of which has a waveform shown in FIG. 4(b). The setting of the slice level is a matter of design. The waveforms shown in FIGS. 4(b) and 4(c) are applied to an AND circuit 6, the output of which is processed by a flip-flop 7, a pulse delay line 8 and an inverter 5. Thus, an STX signal shown in FIG. 4(d) is obtained at an STX signal output terminal STX OUT. The STX signal thus obtained is used to give bit synchronization to the character multiplex signal. The above-mentioned conventional circuit, however, has the following problem. As is known, when the temperature of multivibrator is varied between 0° C. and 60° C., the width of a produced pulse varies by a factor of 1.5 to 2. Accordingly, in the case where exact synchronization is required, the multivibrator cannot be employed. That is, when the multivibrator is employed, a wide operation margin is required to avoid malfunction. As mentioned above, each of the monostable multivibrators 2 and 3 for forming the gate pulse has an unsatisfactory temperature characteristic, and therefore the gate position varies with temperature. Accordingly, it is not possible to make narrow the gate width for extracting the STX signal. That is, it is required to set a large gate width. As a result, when the television signal contains a noise component at a position thereof which precedes the actual STX signal, the noise component is extracted as STX pulse, and therefore a wrong STX signal will be outputted.

An object of the present invention is to provide a method of and an apparatus for receiving a bit synchronizing signal added in a multiplexed information signal which can solve the above-mentioned problem of prior art, and which are not affected by temperature variations and can extract an accurate STX signal from a television signal containing a large amount of noise such as a weak television signal. According to the present invention, there is provided a receiving apparatus for extracting a bit synchronizing signal added in multiplexed information signals which is immune to temperature variations and noise.

A main feature of the present invention resides in that a pulse synchronized with a horizontal sync. signal is employed as a gate pulse which is not influenced by temperature variations, and that a transmitted STX signal is made pass through a filter, which resonates with the transmitted STX signal, to reject noise, and an intermediate or central pulse of the filtered STX signal is used as an STX signal. It has been well known to delay the horizontal sync. signal and remove the color burst signal in order to obtain a gate pulse. However, the above method only detects the width of the horizontal sinc. signal. The basic thought of the present invention that a period between adjacent horizontal synchronizing pulses is detected and divided in equal spacings to thereby provide a gate pulse, has not conventionally been known.

Figure 3:
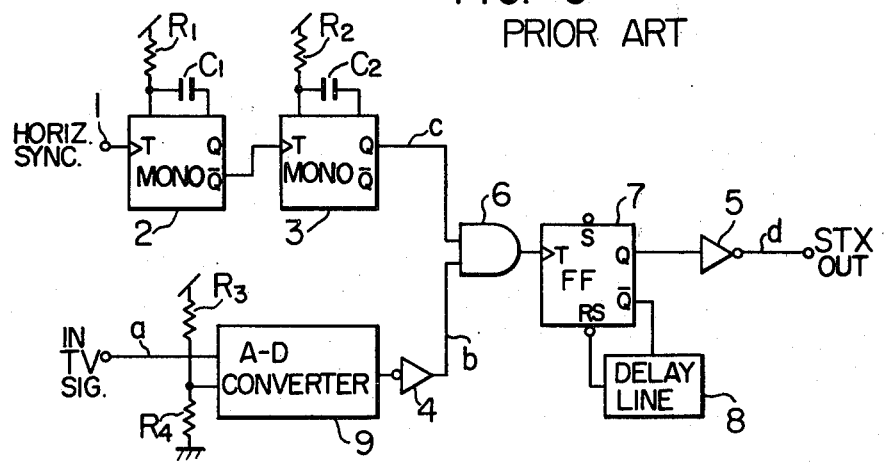
FIG. 3 is a circuit diagram showing a conventional circuit for extracting an STX signal.
Figure 4:
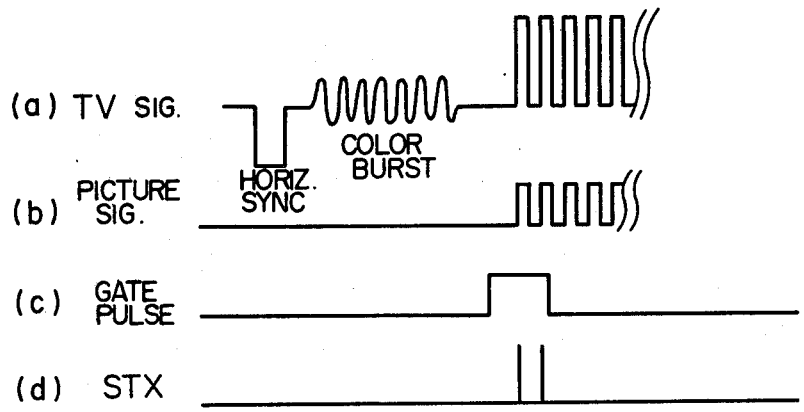

FIGS. 4a–d show signal waveforms at main parts of the circuit shown in FIG. 3.

Figure 5:
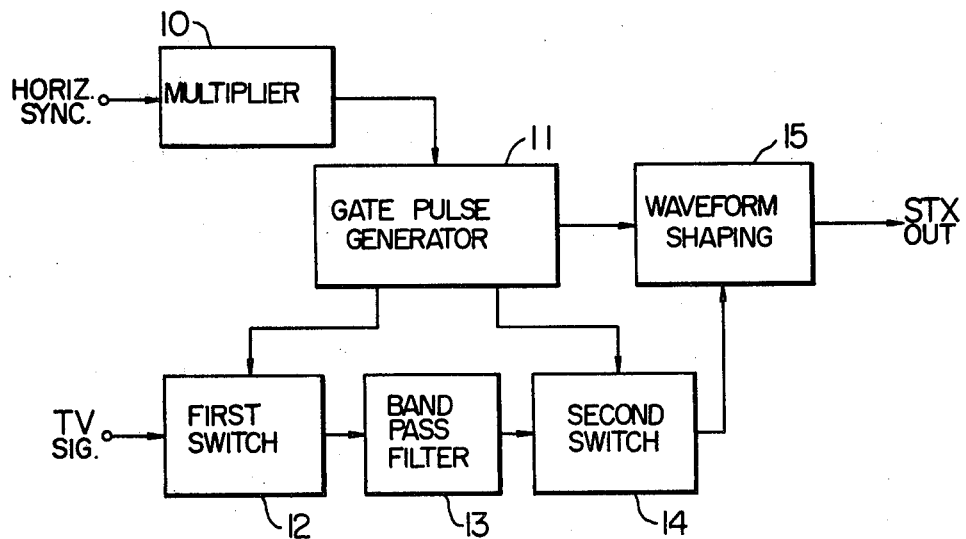

FIG. 5 is a block diagram showing a basic circuit configuration of an apparatus for receiving a multiplexed information signal according to the present invention.

Figure 6:
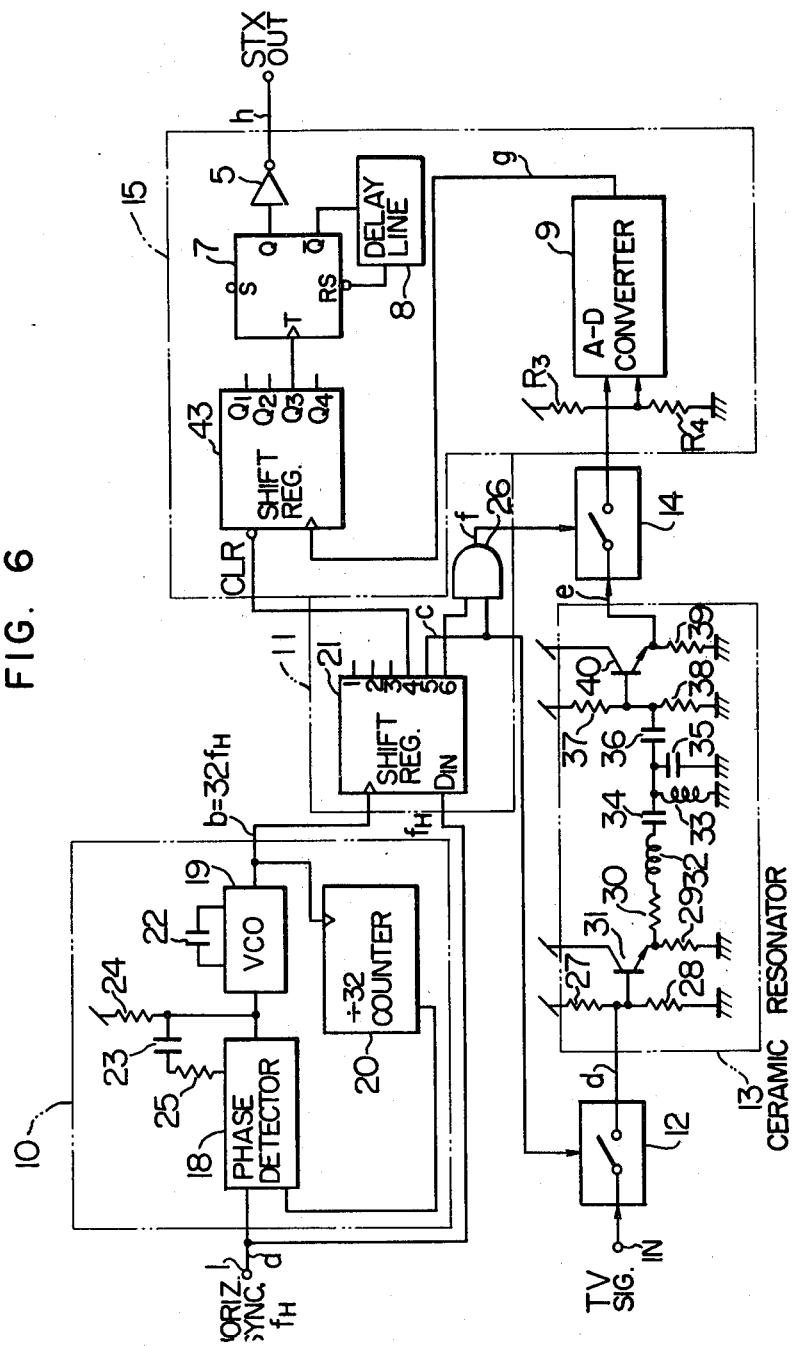

FIG. 6 is a circuit diagram showing an embodiment of a receiving apparatus according to the present invention.

FIGS. 7a–h show signal waveforms at main parts of the embodiment shown in FIG. 6.

Now, explanation will be made of an embodiment of the present invention, with reference to the accompanying drawings. The same elements as in FIG. 3 are given the same reference numerals throughout the drawings.

FIG. 5 is a block diagram showing a basic circuit configuration of a receiving apparatus according to the present invention. Referring to FIG. 5, an apparatus for receiving and detecting a start pulse signal in a character multiplex signal according to the present invention comprises frequency multiplier means 10 applied with a horizontal sync. signal separated from a transmitted television signal by a sync. separator circuit for generating a multiplied-frequency signal synchronized with the horizontal sync. signal and having a frequency N times (N is a positive integer) higher than a horizontal sync. frequency, gate pulse generator means 11 for generating first and second gate signals from the multiplied-frequency signal, first switch means 12 for extracting, by the first gate signal, a binary STX signal provided at the beginning of an information signal multiplexed in the vertical blanking period of the television signal, band pass filter means 13 resonating with a reference STX signal for filtering the extracted STX signal to obtain a noiseless extracted STX signal, second switch means 14 for extracting a waveform from an intermediate or central part of the noiseless extracted STX signal by the second gate signal, and waveform shaping means 15 for shaping a binary signal obtained from the extracted waveform and for providing the shaped binary signal as STX signal.

FIG. 6 is a circuit diagram showing an embodiment of the present invention. Referring to FIG. 6, a low pass filter made up of a phase detector 18, capacitor 23 and resistors 24 and 25, a voltage controlled oscillator (VCO) 19, a capacitor 22 for adjusting oscillation and a counter 20 serving as a frequency demultiplier form a phase locked loop circuit (hereinafter referred to as a "PLL" circuit), which acts as a frequency multiplier. Now, explanation will be made of the case where the frequency demultiplying factor of the counter 20 is made equal to 32, by way of example. The PLL circuit may be formed of, for example, a combination of MC 4044 phase detector and MC 4024 VCO, each of which is manufactured by Motorola.

Figure 1:
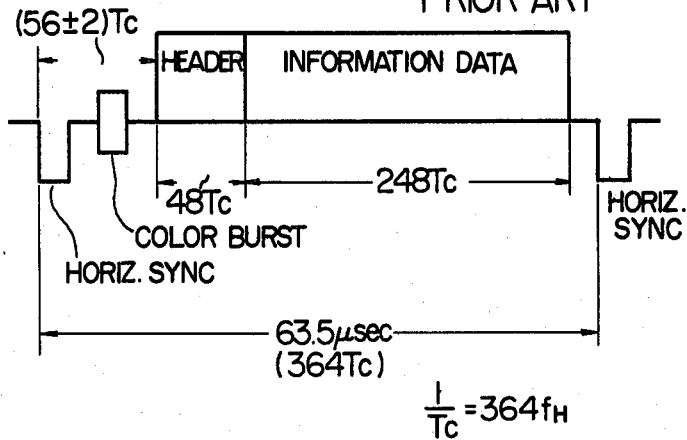
FIG. 1 shows a waveform of a character multiplex signal.
Figure 2:
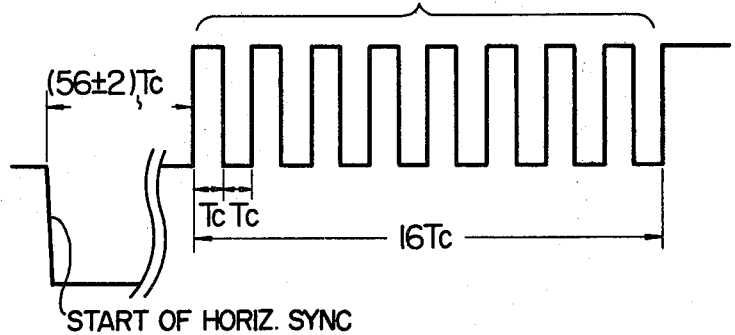
FIG. 2 shows an enlarged waveform of the clock-run-in part of the character multiplex signal shown in FIG. 1.
Figure 7:
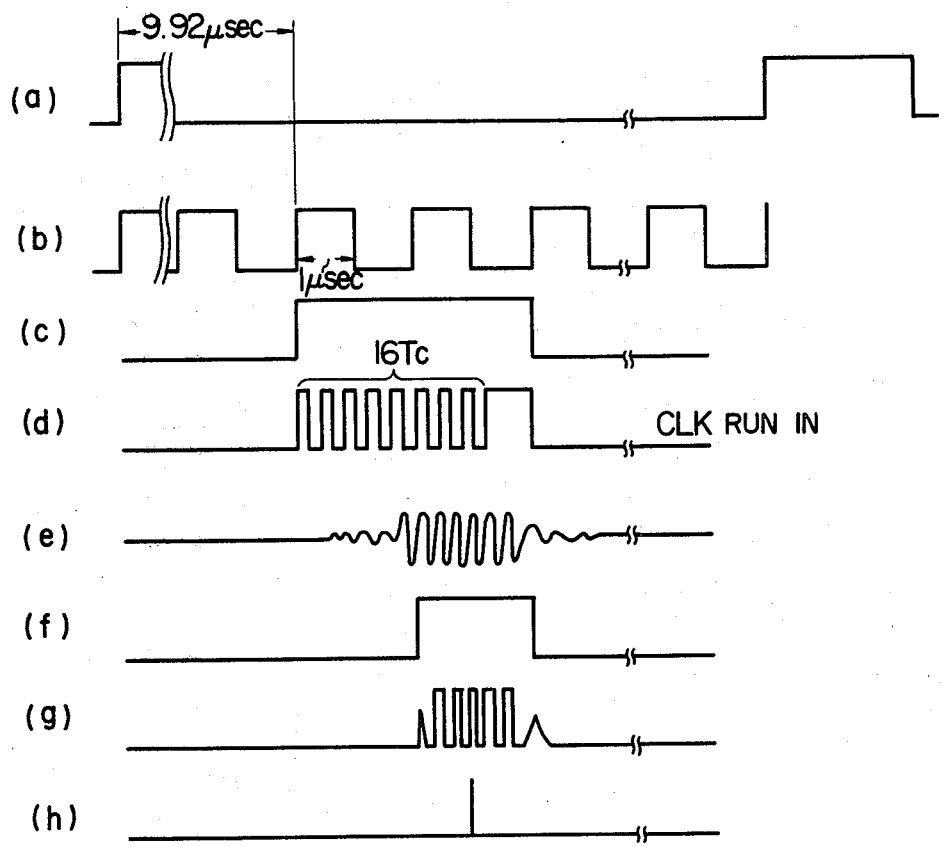

A horizontal synchronizing signal shown in FIG. 7(a) and having a frequency $f_H$ (15.734 KHz) is applied through a terminal 1 to the PLL circuit. The PLL circuit delivers a waveform shown in FIG. 7(b) and having a frequency 32 times higher than $f_H$, which is applied to the clock terminal of a shift register 21. Since the data input terminal of the shift register 21 is applied with the horizontal sync. signal shown in FIG. 7(a), the shift register 21 delivers from the fifth output terminal thereof a waveform shown in FIG. 7(c). This waveform is a signal which is delayed from the rising edge of horizontal sync. pulse by 5/32 $f_H$, that is, by 9.92 $\mu$sec. On the other hand, a binary STX signal multiplexed in the vertical blanking period of television signal, as shown in FIG. 2, starts from a position which is delayed from the rising edge of horizontal sync. pulse by (56±2) $T_c$, that is, by 9.78 $\mu$sec±0.35 $\mu$sec. Since 9.92 $\mu$sec is nearly equal to 9.78 $\mu$sec±0.35 $\mu$sec, the starting position of the signal shown in FIG. 7(c) is nearly equal in time to the starting position of the binary STX signal. Accordingly, when the STX signal multiplexed in the vertical blanking period of television signal is applied through a terminal IN to an analog switch 12 which is operated by the waveform shown in FIG. 7(c), a waveform shown in FIG. 7(d) is outputted from the analog switch 12. Since the waveform shown in FIG. 7(c), namely, a gate pulse has a width nearly equal to the width (about 4 $\mu$sec) of the horizontal sync. pulse, the width of the gate pulse is larger than the width (16 $T_c$, namely, 2.78 $\mu$sec) of the STX signal. Accordingly, the analog switch 12 extracts not only the STX signal but also subsequent parts of the multiplex signal. At this time, there is a danger that noise enters the extracted signal. The extracted signal is made pass through a band pass filter 13 which is made up of a transistor 31, resistors 27 to 30, inductors 32 and 33, capacitors 34 to 36, resistors 37 to 39, and a transistor 40, and which allows only the STX signal to pass therethrough. Thus, noise is removed, and a waveform shown in FIG. 7e is obtained. The band pass filter 13 has a center frequency equal to one half of bit rate, that is, a center frequency of $\frac{1}{2} T_c$, and may be formed of a well-known ceramic resonator. The filtered signal is subjected to attenuation at both ends thereof, and therefore it is necessary to extract only a central portion of the filtered signal. To this end, the fifth and sixth outputs of the shift register 21 are applied to an AND circuit 26, which delivers a gate pulse shown in FIG. 7(f). The output of the band pass filter 13 is applied to an analog siwtch 14, which is operated by the gate pulse shown in FIG. 7(f). Thus, the analog switch 14 delivers the central portion of the filtered signal, that is, the central portion of the STX signal, which is applied to an amplitude comparator 9 (i.e. an A-D converter) to be compared with a voltage determined by resistors $R_3$ and $R_4$. A waveform shown in FIG. 7(g) is outputted from the amplitude comparator 9. Since the filtered signal is slightly different in time from the gate pulse shown in FIG. 7(f), the first pulse shown in FIG. 7(g) has an incomplete waveform. Next, the output of the amplitude comparator 9 is applied to the clock terminal of a counter 43, which has been previously cleared by the fourth output of the shift register 21. Accordingly, an output pulse from the $Q_3$ output of the counter 43 has a waveform such as whose output level changes from "0" to "1" at the rising edge of the fourth pulse shown in FIG. 7(g). This means that a central part of the pulse train shown in FIG. 7(g) is extracted. The output pulse from the $Q_3$ output of the counter 43 is processed by a flip-flop 7, a pulse delay line 8, and an inverter 5, and thus a thin pulse having a waveform shown in FIG. 7(h), namely, an STX output signal is obtained.

In the above-mentioned embodiment, the frequency demultiplying factor of the counter 20 is made equal to 32, for the convenience of explanation. However, it is possible to make the frequency demultiplying factor larger, for example, equal to 91 ($=364/4$), for the purpose of enhancing the positional accuracy of the gate pulse. Inversely, it is also possible to make the frequency demultiplying factor smaller, for example, equal to 16, for the purpose of simplifying the circuit construction. In the above embodiment, the gate pulses used for the switches 12 and 14 have pulses widths different from each other, but for simplicity of the circuit these pulse widths may be made equal. Further, the $Q_3$ output of the counter 43 is employed to take out the fourth pulse shown in FIG. 7(g). However, as can be